2,999,864
METAL DERIVATIVES OF BORANE ADDUCTS

Henry C. Miller, Wilmington, Del., and Earl L. Muetterties, Chadds Ford, Pa., assignors to E. I. du Pont de Nemours and Company, Wilmington, Del., a corporation of Delaware
No Drawing. Filed Dec. 15, 1958, Ser. No. 780,194
7 Claims. (Cl. 260—340.6)

This invention relates to a new class of boron compounds and to a method for preparing them.

Boron compounds, and particularly boron hydrides, have received a great deal of attention during the past few years as components of high energy fuels. As a result of this activity, boron hydrides are becoming more readily available and new outlets for them are being sought. One such new application involves their use as reducing agents.

We have now found a new type of boron compound useful in this field of reducing agents. Our novel products which have useful reducing properties are compounds of the formula $M(BH_3YR_2)_z$, where M is a metal of groups I–A and II of the periodic table having a valence of $z$ and an atomic number no greater than 56, i.e. lithium, sodium, potassium, rubidium, cesium, beryllium, magnesium, calcium, zinc, strontium, cadmium and barium, Y is an element of group V–A of the periodic table having an atomic number no greater than 51, i.e., nitrogen, phosphorus, arsenic and antimony, and R is a monovalent hydrocarbon radical, preferably an alkyl or cycloalkyl radical having 1–10 carbon atoms.

The periodic table referred to herein is the one appearing in Deming's "General Chemistry," Chap. 11, 5th Ed., John Wiley & Sons, Inc., 1944.

The products of this invention are prepared by reacting a metal hydride, $MH_z$, with a borane adduct of the formula $R_2YH \cdot BH_3$, wherein the symbols M, z, R and Y have the same significance as stated above. This reaction is illustrated by the following general equation:

$$MH_z + zR_2YH \cdot BH_3 \rightarrow M(BH_3YR_2)_z + zH_2$$

The reaction is conveniently carried out in an organic liquid which is a solvent for the borane adduct $$R_2YH \cdot BH_3$$

starting material and which is free from active hydrogens (as determined by the Zerewitinoff reaction). Especially useful solvents include ethers and aromatic hydrocarbons. Specific examples of suitable solvents include diethyl ether, tetrahydrofuran, dioxane, dimethyl ether of ethylene glycol, benzene, xylene, and the like.

Reaction between the metal hydride and borane adduct takes place at ordinary or moderately reduced or elevated temperatures, e.g., from about −10° C. up to about 50° C. with evolution of hydrogen. Since the reaction is exothermic, it is preferred to cool the reaction mixture externally as necessary to maintain the temperature below about 50° C. After reaction is complete, as evidenced by no further liberation of hydrogen, the reaction mixture is filtered to remove any excess metal hydride, which is insoluble in the reaction medium. The reaction product, $M(BH_3YR_2)_z$, remains in solution in the reaction medium.

In some cases the product need not be isolated from the filtered reaction mixture as it can be used in solution. In some cases the salts of this invention can be precipitated from the reaction solution by addition of a non-solvent, e.g., by addition of petroleum ether. In other cases the product salt can be precipitated as a dioxanate by the addition of dioxane to the filtered reaction mixture, followed by cooling to about 10° C. The resulting crystals of the dioxanate are filtered out and then dried under reduced pressure at moderately elevated temperatures, e.g., up to 40–50° C. The product salts can also be isolated by simply removing the reaction solvent from the filtered reaction mixture by distillation or evaporation at ordinary or reduced pressure.

The proportions of the reactants employed in the process of this invention are usually the stoichiometric amounts required by the equation shown above. However, an excess of either of the reactants can be used if desired. Since any unreacted metal hydride is readily recovered by filtration of the reaction mixture, it is usually preferred to use an excess, e.g., up to 100% excess, of metal hydride in order to obtain more complete reaction of the $R_2YH \cdot BH_3$ reactant.

The borane adducts used as starting materials in the process of this invention having the formula $BH_3 \cdot HYR_2$ can be made by the addition of diborane to the hydrides of the elements of group V–A by the process described by Burg and Wagner, J. Am. Chem. Soc. 75, 307–27 (1953). The solvents and metal hydrides used in the process are of the ordinary grades of these materials that are commonly available, or that can be made by known methods. Methods for the preparation of the hydrides are given in Hurd's "Chemistry of the Hydrides," John Wiley & Sons, Inc., 1952. However, it is preferred that the solvent be essentially anhydrous because any moisture present in the reaction system will cause liberation of hydrogen.

The invention is illustrated in further detail by the following examples:

Example I $$NaH + BH_3NH(CH_3)_2 \rightarrow H_2 + NaBH_3N(CH_3)_2$$

To a suspension of 2.0 g. of sodium hydride (0.083 mole) in dry ethylene glycol dimethyl ether there is added portion-wise 4.0 g. (0.068 mole) of dimethylaminoborane $[BH_3NH(CH_3)_2]$. Hydrogen is evolved in an exothermic reaction which requires external cooling to keep the reaction temperature below 40–45° C. After the reaction is complete, as indicated by no further evolution of hydrogen, the mixture is filtered to remove the excess sodium hydride which is insoluble. The filtrate is diluted with about an equal volume of dioxane and then chilled. White crystals separate and they are collected, washed with dioxane, and dried under vacuum at 40–50° C. to give 2.3 g. of the hemidioxanate of $NaBH_3N(CH_3)_2$.

*Analysis.*—Calc'd for $NaBH_3N(CH_3)_2 \cdot \frac{1}{2}C_4H_8O_2$: Na, 18.4%; C, 38.5%; H, 10.5%; N, 11.2%; B, 8.66%, $H_2$ on hydrolysis, 538 cc./g. Found: Na, 19.2%; C, 35.17%; H, 10.07%; N, 10.28%, 10.35%; B, 8.06%; $H_2$ on hydrolysis, 491 cc./g.

Similar reactions take place when the sodium hydride of Example I is replaced by lithium and barium hydrides and reacted with dimethylamine-borane as in Example I. In these cases the products are $LiBH_3N(CH_3)_2$ and $Ba[BH_3N(CH_3)_2]_2$.

Example II

To a suspension of 3.0 g. of sodium hydride (0.124 mole) in 25 cc. of dry ethylene glycol dimethyl ether there is added dropwise at room temperature 4.7 g. (0.063 mole) of dimethylphosphine-borane $$[BH_3PH(CH_3)_2]$$

Hydrogen is evolved in an exothermic reaction which requires external cooling to keep the reaction temperature below 30–40° C. After the reaction is complete, as indicated by no further evolution of hydrogen, the mixture is filtered to remove excess sodium hydride. Addition of dioxane to the filtered reaction mixture gives no precipitate of a dioxanate. The reaction solution is then evaporated to dryness at a pressure less than 50 mm. mercury and there is obtained a residue of white crystals. These crystals are washed with diethyl ether, and dried under vacuum at room temperature. There is obtained 3.4 g. of the product $NaBH_3P(CH_3)_2$.

*Analysis.*—Calc'd for $NaBH_3P(CH_3)_2 \cdot 0.5C_4H_8O_2$: P, 21.8%; $H_2$ on hydrolysis, 475 cc./g. Found: P, 21.05%; $H_2$ on hydrolysis, 455 cc./g.

The product of Example II is very hygroscopic, and is soluble in water without reaction. The aqueous solution has a strong reducing reaction; it reduces aqueous solutions of silver and mercury salts to the free metals.

While the examples have illustrated the products of this invention with reference to particular salts of the formula $M(BH_3YR_2)_z$, it is to be understood that our invention also includes salts obtained from other metal hydrides, $MH_z$ and borane complexes of the formula $R_2YH \cdot BH_3$, wherein M is a metal of groups I–A and II of periodic table having a valence z and an atomic number no greater than 56, Y is an element of group V–A of the periodic table having an atomic number no greater than 51, and R is a monovalent hydrocarbon radical, preferably an alkyl or cycloalkyl radical having 1–10 carbon atoms. Specific examples of such other products and the reactants from which they are obtained in accordance with the process of our invention are listed in the following Table I:

TABLE I

| Products | Reactants | |
|---|---|---|
| $KBH_3N(C_2H_5)_2$ | KH | $BH_3NH(C_2H_5)_2$ |
| $CsBH_3P(C_{10}H_{21})_2$ | CsH | $BH_3PH(C_{10}H_{21})_2$ |
| $RbBH_3N(C_4H_9)_2$ | RbH | $BH_3NH(C_4H_9)_2$ |
| $NaBH_3As(C_3H_7)_2$ | NaH | $BH_3AsH(C_3H_7)_2$ |
| $LiBH_3Sb(CH)_2$ | LiH | $BH_3SbH(CH_3)_2$ |
| $Be[BH_3P(C_2H_5)_2]_2$ | $BeH_2$ | $BH_3PH(C_2H_5)_2$ |
| $Mg[BH_3P(C_6H_{11})_2]_2$ | $MgH_2$ | $BH_3PH(C_6H_{11})_2$ |
| $Ca[BH_3As(C_4H_7)_2]_2$ | $CaH_2$ | $BH_3AsH(C_4H_7)_2$ |
| $Sr[BH_3Sb(C_8H_{17})_2]_2$ | $SrH_2$ | $BH_3SbH(C_8H_{17})_2$ |
| $Zn[BH_3N(C_2H_5)_2]_2$ | $ZnH_2$ | $BH_3NH(C_2H_5)_2$ |
| $Cd[BH_3P(CH_3)_2]_2$ | $CdH_2$ | $BH_3PH(CH_3)_2$ |

Aqueous solutions of the salts of our invention reduce silver nitrate slowly to the free metal under conditions of low pH, i.e., pH of less than 7. However, rapid reduction of silver nitrate to the free metal is obtained with aqueous solutions of the salts in basic solutions, for example, in solutions containing ammonium hydroxide.

The products of our invention possess good stability at room temperature toward loss of hydrogen. This is in contrast to the behavior of the known compound $NaBH_3NH_2$ which is not stable to loss of hydrogen at temperatures above $-15°$ C.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Compounds represented by the formula $$M(BH_3YR_2)_z$$

where M is a metal selected from the class consisting of groups I–A and II of the periodic table, having a valence of z and an atomic number no greater than 56, Y is an element of group V–A of the periodic table having an atomic number no greater than 51, and R is a monovalent hydrocarbon radical of 1 to 10 carbon atoms selected from the group consisting of alkyl and cycloalkyl.

2. The compound represented by the formula $$NaBH_3N(CH_3)_2$$

3. The hemidioxanate of the compound represented by the formula $NaBH_3N(CH_3)_2$.

4. The compound represented by the formula $$NaBH_3P(CH_3)_2$$

5. Process which comprises reacting a metal hydride of the formula $MH_z$ wherein M represents a metal selected from the class consisting of groups I–A and II of the periodic table having a valence of z and an atomic number no greater than 56, with a borane adduct of the formula $R_2YH \cdot BH_3$ wherein R is a monovalent hydrocarbon radical of 1 to 10 carbon atoms selected from the group consisting of alkyl and cycloalkyl and Y is an element of group V–A of the periodic table having an atomic number no greater than 51.

6. The process of claim 5 wherein the reaction is effected in an organic liquid, said liquid being a solvent for the borane adduct and free from active hydrogens as determined by the Zerewitinoff reaction.

7. The process of claim 5 wherein the reaction temperature is maintained below about 50° C.

References Cited in the file of this patent

Smith et al.: "J. Amer. Chem. Soc.," vol. 73, pp. 2751–4 (1951). (Copy in Scientific Library.)